(12) United States Patent
White

(10) Patent No.: US 8,956,170 B2
(45) Date of Patent: Feb. 17, 2015

(54) CONTROLLED FORCE GROUND POWER CONNECTOR

(75) Inventor: John Andrew White, Thousand Oaks, CA (US)

(73) Assignee: Cooper Technologies Company, Houston, TX (US)

( * ) Notice: Subject to any disclaimer, the term of this patent is extended or adjusted under 35 U.S.C. 154(b) by 47 days.

(21) Appl. No.: 13/481,786

(22) Filed: May 26, 2012

(65) Prior Publication Data

US 2013/0316591 A1    Nov. 28, 2013

(51) Int. Cl.
*H01R 13/64* (2006.01)

(52) U.S. Cl.
USPC .......................................... 439/252; 439/839

(58) Field of Classification Search
USPC .................... 439/252, 686, 839, 247
See application file for complete search history.

(56) References Cited

U.S. PATENT DOCUMENTS

| | | | | |
|---|---|---|---|---|
| 1,677,068 A | * | 7/1928 | Alden | 439/839 |
| 2,346,831 A | * | 4/1944 | Drury | 439/839 |
| 3,518,617 A | * | 6/1970 | Bosworth et al. | 439/346 |
| 4,070,088 A | * | 1/1978 | Vaden | 439/825 |
| 4,296,986 A | * | 10/1981 | Herrmann, Jr. | 439/322 |
| 4,758,175 A | * | 7/1988 | Didier et al. | 439/281 |
| 4,845,593 A | * | 7/1989 | Brown et al. | 361/192 |
| 5,197,908 A | * | 3/1993 | Nelson | 439/825 |
| 5,676,571 A | * | 10/1997 | Matthews | 439/843 |
| 6,688,905 B2 | * | 2/2004 | Williams | 439/461 |
| 6,994,598 B2 | * | 2/2006 | Holmes et al. | 439/752.5 |

OTHER PUBLICATIONS

The International Search Report and Written Opinion for Corresponding Application No. PCT/US2013/041946, Mailed May 27, 2014 (10 pages).

* cited by examiner

*Primary Examiner* — Hien Vu
(74) *Attorney, Agent, or Firm* — King & Spalding LLP

(57) ABSTRACT

A ground power connector comprising: a plug body comprising a cavity, wherein the cavity comprises an inside dimension; a female socket positioned within the cavity, wherein the female socket comprises an outside dimension, wherein the outside dimension of the female socket is smaller than the inside dimension of the cavity; and a support of the female socket in the cavity, wherein the support allows the female socket to change positions within the cavity. A method of manufacturing a ground power connector having a female socket, the method comprising: providing an internal block comprising a cavity; inserting at least a portion of a female socket into the cavity of the internal block; sealing the cavity of the internal block; and molding a rubber plug body onto an exterior of the internal block so that the plug body flexibly supports the female socket in the cavity.

10 Claims, 16 Drawing Sheets

CONTROLLED FORCE GROUND POWER CONNECTOR

TECHNICAL FIELD

Embodiments of the invention relate generally to ground power connectors used on commercial and military aircraft, and more particularly to ground supply free power connectors (plugs) that control the mating and disengaging forces with aircraft fixed connectors (receptacles).

BACKGROUND

Between flights, commercial and military aircraft typically park at a terminal facility. When parked, the aircraft engines may be powered down. Electrical power that would otherwise be supplied by the aircraft engines may be supplied by an external source, such as a ground power cart or a generator associated with a sky-bridge. A ground power connector at the end of a power supply cable couples the external power source to the aircraft. Commercial and military aircraft typically have a fixed connector somewhere on the underside near the nose landing gear. Aircraft fixed connectors comprise a receptacle with male contact pins positioned therein. Ground power connectors comprises a plug with female sockets positioned therein, wherein the plug mates with the receptacle and the female sockets mate with the male contact pins.

The coupling between the ground power connector and the fixed connector is typically maintained by a physical engagement of the mating forces at both the plug/receptacle and pin/socket interfaces. The Engineering Society for Advancing Mobility Land Sea Air and Space (SAE) has promulgated an Aerospace Standard related to cable assemblies and attachable plugs for external electric power; (SAE AS7974). If the total mating forces are not sufficiently great to maintain the coupling between the aircraft fixed connector (receptacle) and the ground power connector (plug), gravitational forces will disconnect the ground power connector (plug) from the aircraft fixed connector (receptacle), and the ground power connector (plug) will drop to the ground and likely become damaged or worn. In addition to the potential for damage to the ground power connector (plug), it is undesirable for the ground power connector (plug) to prematurely disconnect from the aircraft fixed connector (receptacle), because a disconnect results in a loss of power supply to the aircraft. Electrical connectivity can also be affected my low mating forces due to low socket to pin wiping forces that will not adequately remove tarnish, oxides and corrosion form the mating surfaces which is equally undesirable.

A socket contact is a female contact designed to mate to a pin or male contact. It is preferentially connected to the "power" side of a circuit where the pin is preferentially connected to the "return," "ground" or "load" side of the circuit. There is no industry standard for this preference. It is also important for each of the individual female sockets of the ground power connector (plug) to maintain physical engagement through coupling forces with each of the corresponding individual male pins of the aircraft fixed connector (receptacle). When physical engagement through coupling forces is not maintained between a pin and a socket, electrical arcing may generate excessive resistance leading to excessive heat and increased electrical resistance to the power supply. Electrical arcing and excessive heat may prematurely damage the pin or the socket.

In typical commercial and military terminal operations, ground power connectors are coupled/decoupled to/from several different aircraft each day. The simple action of inserting the ground power connector (plug) into an aircraft fixed connector (receptacle) in conventional plugs wears mating surfaces at both the plug/receptacle and pin/socket interfaces. Such wear may prevent sufficient mating forces to maintain physical engagement. Further, such wear at the pin/socket interface may lead to poor physical engagement so as to result in electrical arcing and excessive heat at one or more of the individual pin/socket interfaces.

SUMMARY

In accordance with the teachings of the present disclosure, disadvantages and problems associated with ground power connectors have been reduced.

According to one aspect of the invention, there is provided a ground power connector comprising: a plug body comprising a cavity, wherein the cavity comprises an inside dimension; a female socket positioned within the cavity, wherein the female socket comprises an outside dimension, wherein the outside dimension of the female socket is smaller than the inside dimension of the cavity; and a support of the female socket in the cavity, wherein the support allows the female socket to change positions within the cavity.

A further aspect of the invention provides a ground power connector comprising: of an internal block comprising a cavity having an inside dimension suitable envelope for containing a pivot contact; a female socket positioned within the cavity, wherein the female socket comprises an outside dimension with a specified envelop allowing a pivot contact, wherein the outside dimension of the female socket is smaller than the inside dimension of the cavity, wherein the pivot contacts of the internal block and the female socket are engaged to support the female socket in the cavity so as to enable the female socket to pivot within the cavity at the pivot contacts; a female socket with a tapered bore allowing preferential alignment to bend pin contacts without introducing binding forces, and a plug body that houses the internal block and the female socket and comprises a flexible portion that flexibly seals the female socket in the cavity.

Still another aspect of the invention provides a method of manufacturing a ground power connector having a female socket, the method comprising: providing an internal block comprising a cavity; inserting at least a portion of a female socket into the cavity of the internal block; sealing the cavity of the internal block; and molding a rubber plug body onto an exterior of the internal block so that the plug body flexibly supports the female socket in the cavity.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features. Reference will now be made to the accompanying drawings, which are not necessarily drawn to scale nor proportionally, and wherein.

Figure 1:
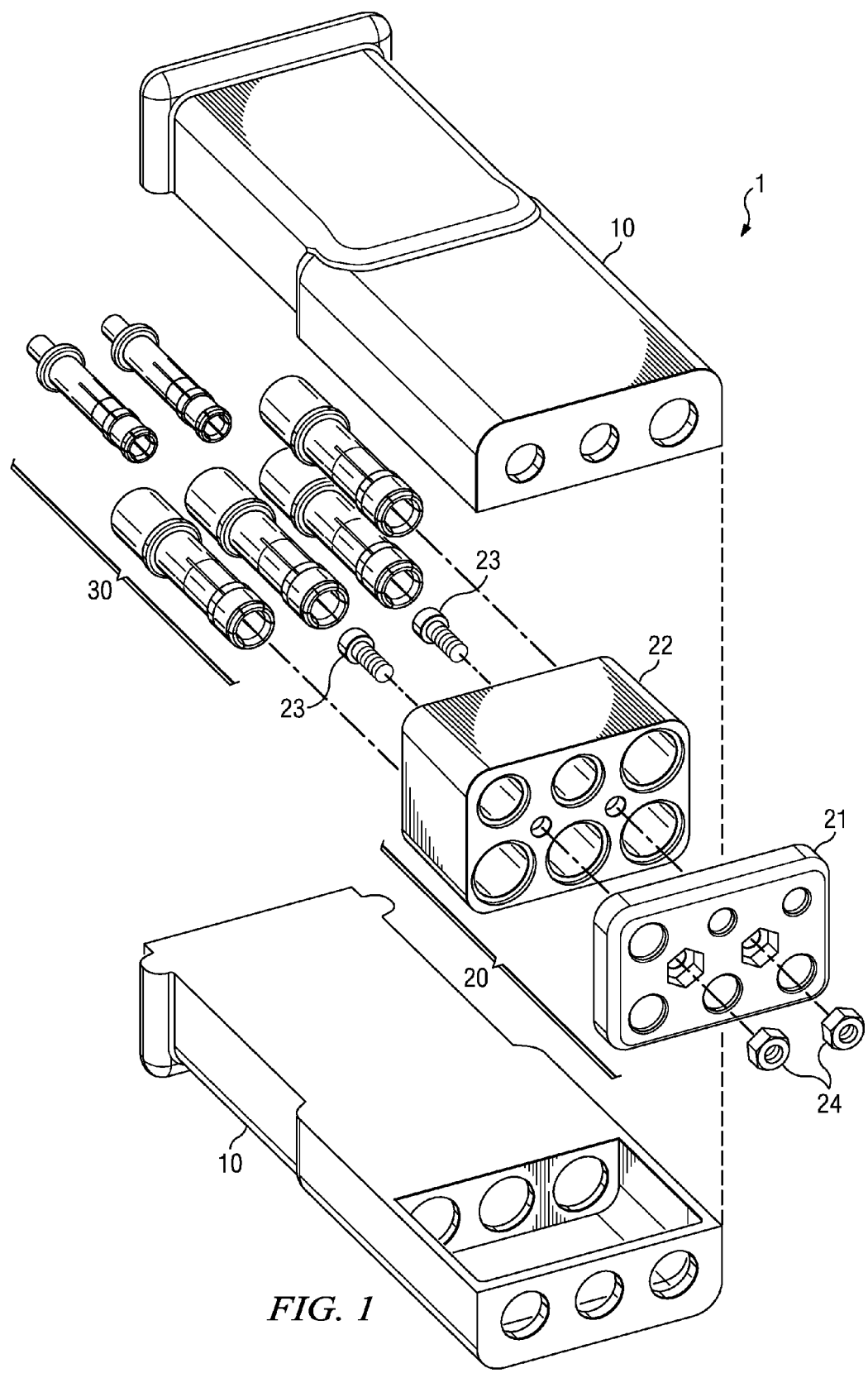
FIG. 1 is a perspective, exploded view of a ground power connector (plug) having a plug body, and internal block and a socket group of six sockets. In alternative embodiments, there are also connectors that have 3 contacts—2 power and 1 signal. Another configuration comprises 2 power and 4 signal socket connectors.

The drawings illustrate only exemplary embodiments of the invention and are therefore not to be considered limiting of its scope, as the invention may admit to other equally effective embodiments. The elements and features shown in the drawings are not necessarily to scale, emphasis instead being placed upon clearly illustrating the principles of exemplary embodiments of the present invention. Additionally, certain dimensions may be exaggerated to help visually convey such principles. In the drawings, reference numerals designate like or corresponding, but not necessarily identical, elements.

DETAILED DESCRIPTION

Preferred embodiments and their advantages over the prior art are best understood by reference to FIGS. 1 through 6C below. However, the present disclosure may be more easily understood in the context of a high level description of certain embodiments.

The ground power connectors of the present invention are intended for use at airfields, aircraft carriers, aircraft hangers and on ground power carts or other aircraft power sources. They are to be plugged into external power receptacles on aircraft to connect the aircraft to external sources of electric power. Embodiments of the present invention are directed to an approach that allows the sockets to float in an internal block. The internal block may have socket cavities designed to allow the sockets to float within the cavities.

Figure 7:
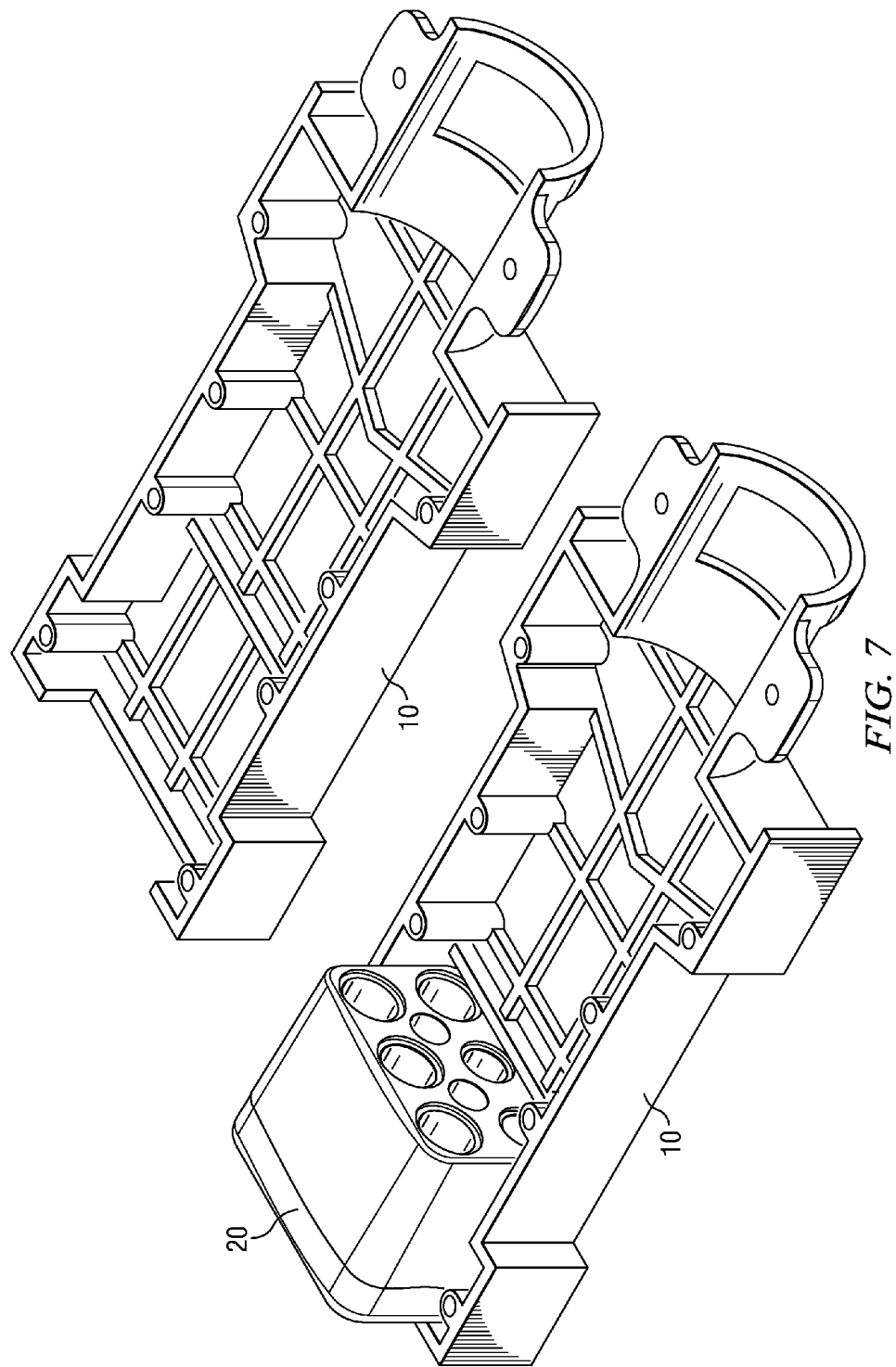
FIG. 7 is a perspective view of two half-shells of a field attachable plug body and an internal block positioned between the half-shells.

An exploded perspective view of a ground power connector (plug) 1 of the present invention is shown in FIG. 1. The ground power connector (plug) 1 has a plug body 10, an internal block 20, and a socket group 30. In an assembled configuration, the socket group 30 is positioned within the internal block 20, and the assembled internal block is positioned within the plug body 10. In certain embodiments, the plug body 10 is a molded synthetic rubber outer shell that is molded around the internal components. FIG. 1 shows two halves, but in some embodiments, the plug body is molded as a unitary whole. Alternatively, a field attachable version of this connector may have two hard plastic shells that may be filled with potting material (probably polyurethane or similar potting polymeric material), for assembly on a cable. One embodiment is to mold over the inner block, but a two piece plug body could be made with the same features. FIG. 7 is a perspective view of two shells with and an internal block. A cable, not shown in FIG. 1, may be connected to the ground power connector (plug) 1 to a backside of the molded synthetic rubber plug body 10.

Figure 2A:
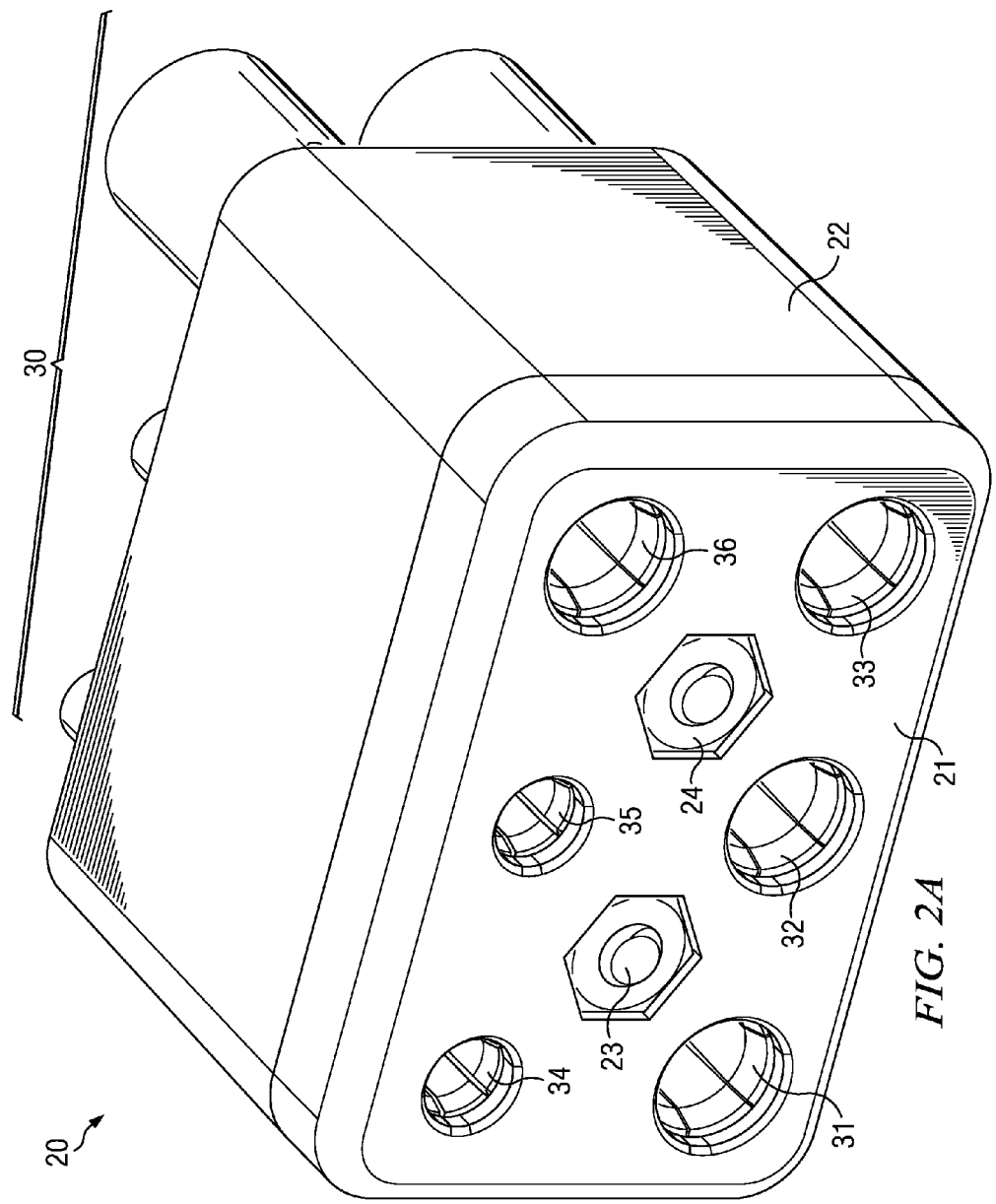
FIG. 2A is a perspective view of an internal block having a face section and a body section, wherein a group of a number female sockets (six are shown) are inserted into and equal number cavities in the internal block.

FIGS. 2A through 2G illustrates various views of the internal block 20 and socket group 30. FIG. 2A is an assembled perspective view of the internal block 20 and socket group 30. The internal block 20 has a face section 21 and a body section 22. These two sections are held together by two bolts 23 and nuts 24. The internal block 20 has cavities that extend through both the face section 21 and the body section 22 for housing individual sockets of the socket group 30. In particular, there are cavities for housing each individual socket, shown but not limited to: socket "N" 31, socket "C" 32; socket "B" 33, socket "E" 34, socket "F" 35, and socket "A" 36. Contact identification, numbers and physical configurations vary depending on the aircraft receptacle configuration. In alternative embodiments, the internal block may be a unitary whole. Further, if the internal block is made of two or more parts, the parts may be fastened or bonded by any means known to persons of skill in the art. Bonding, ultrasonic welding, plastic stakes are all examples.

Figure 2B:
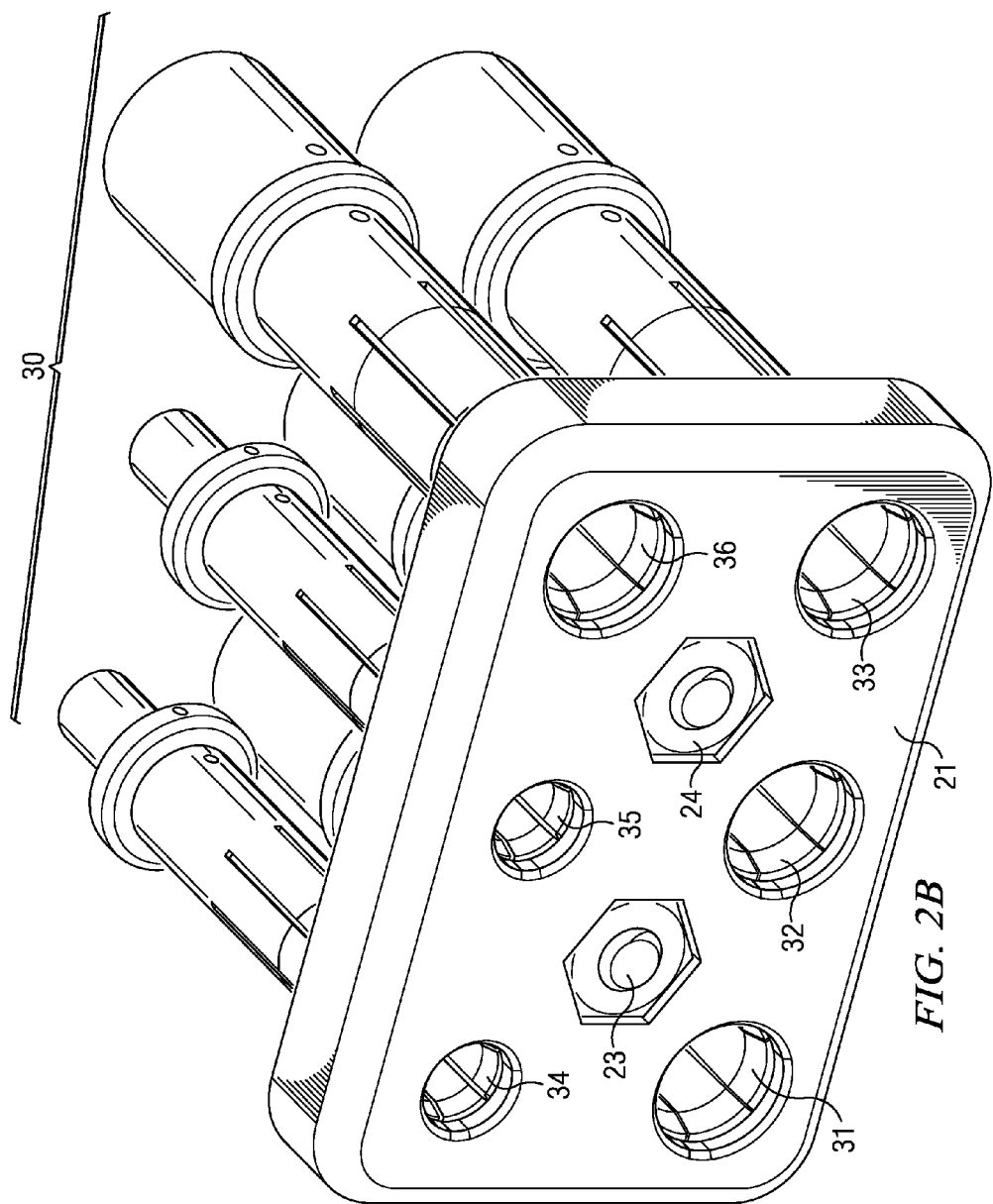
FIG. 2B is a perspective view of the internal block of FIG. 2A, wherein the body section is removed to expose barrel sections of the female sockets.

FIG. 2B is a perspective view of the internal block 20 shown in FIG. 2A, except that the rear body section 22 of the internal block 20 is not shown. As shown, each of the sockets in the socket group 30 are positioned relatively parallel to each other within the internal block 20. The holes in the face section 21 of the internal block are positioned relative to each other so as to correspond to the positions of male contact pins of an aircraft fixed connector (receptacle). Different plug configurations are possible depending on the aircraft receptacle configuration.

Figure 2C:
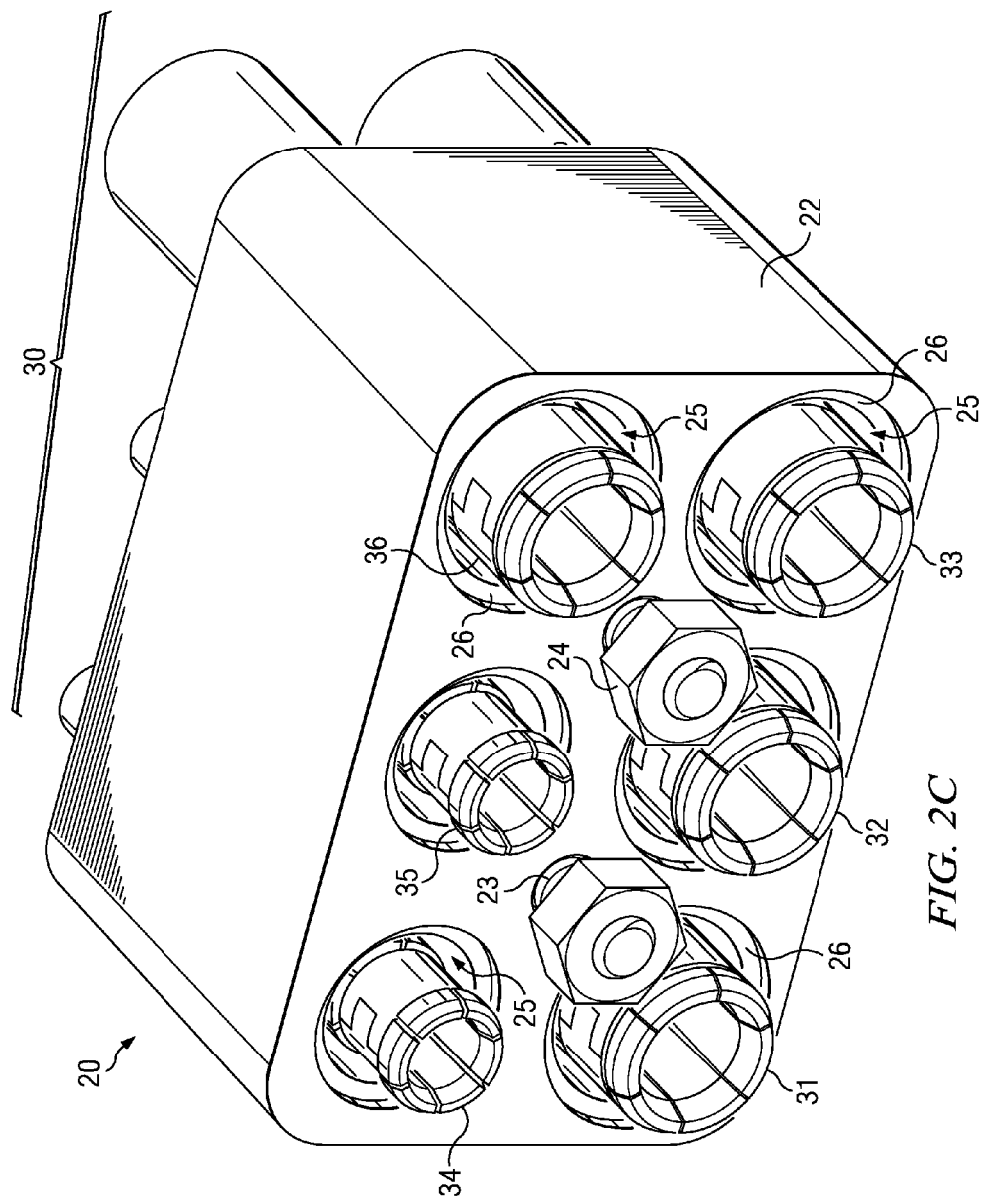
FIG. 2C is a perspective view of the internal block of FIG. 2A, wherein the face section is removed to expose tyne sections of the female sockets.

FIG. 2C is a perspective view of the internal block 20 and socket group 30 shown in FIG. 1A, except that the face section 21 is hidden or removed. The individual sockets 31 through 36 are shown protruding from cavities 25 extending through the body section 22 of the internal block 20. The inside diameters of the cavities 25 are larger than the outside diameters of the sockets 31 through 36 so that an annulus is defined around each of the sockets 31 through 36. Further, each of the cavities 25 in the body section 22 have a countersink 26 for a receiving annular flanges 27 that extend from the back of the face section 21 (see FIG. 2E).

Figure 2D:
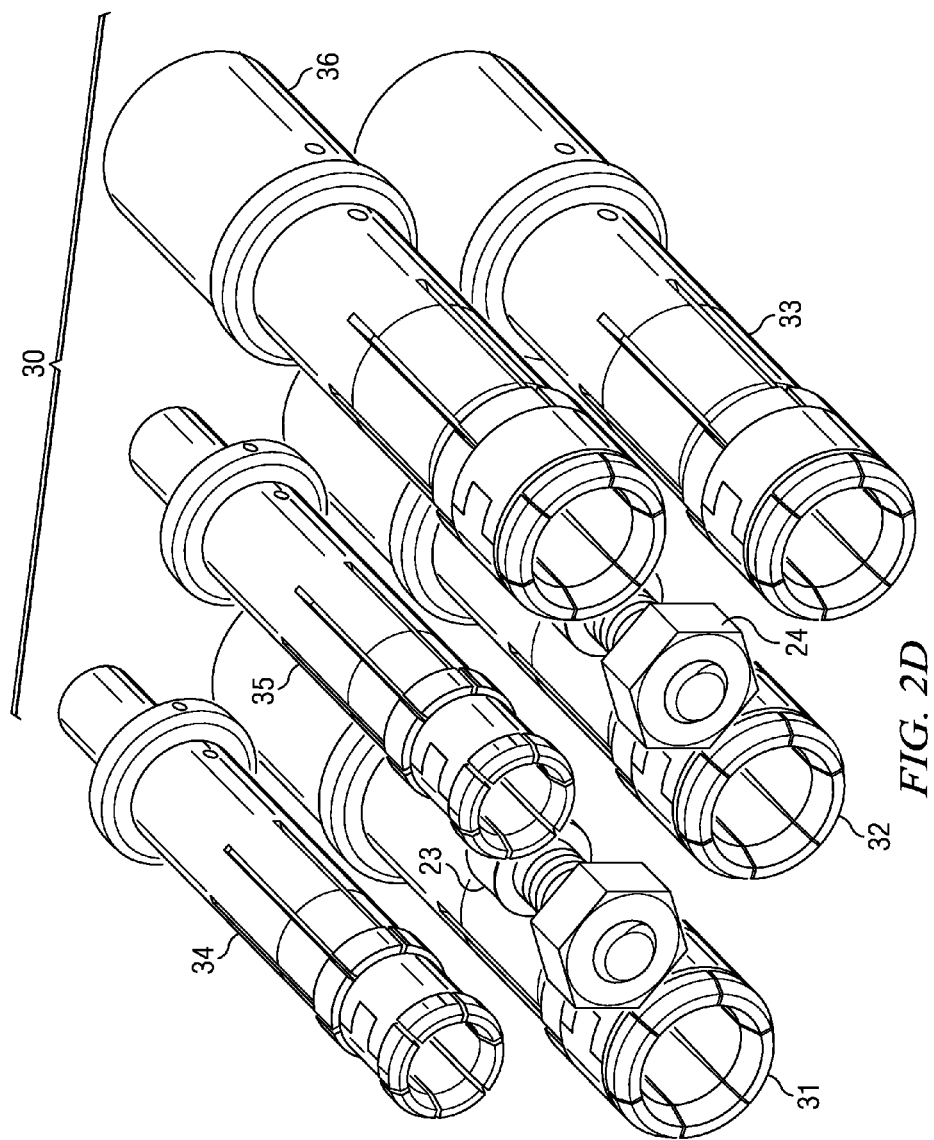
FIG. 2D is a perspective view of the socket group of FIG. 2A, wherein the internal block is removed to expose the sockets.

FIG. 2D is a perspective view of a socket group 30 and the nuts 24 and bolts 23 that are used to fasten the face section 21 and body section 22 of an internal block 20, not shown. Nuts and bolts are one of several possible fastener embodiments that can be used to hold a multipiece internal block together and would not be necessary for a single piece internal block.

Figure 2E:
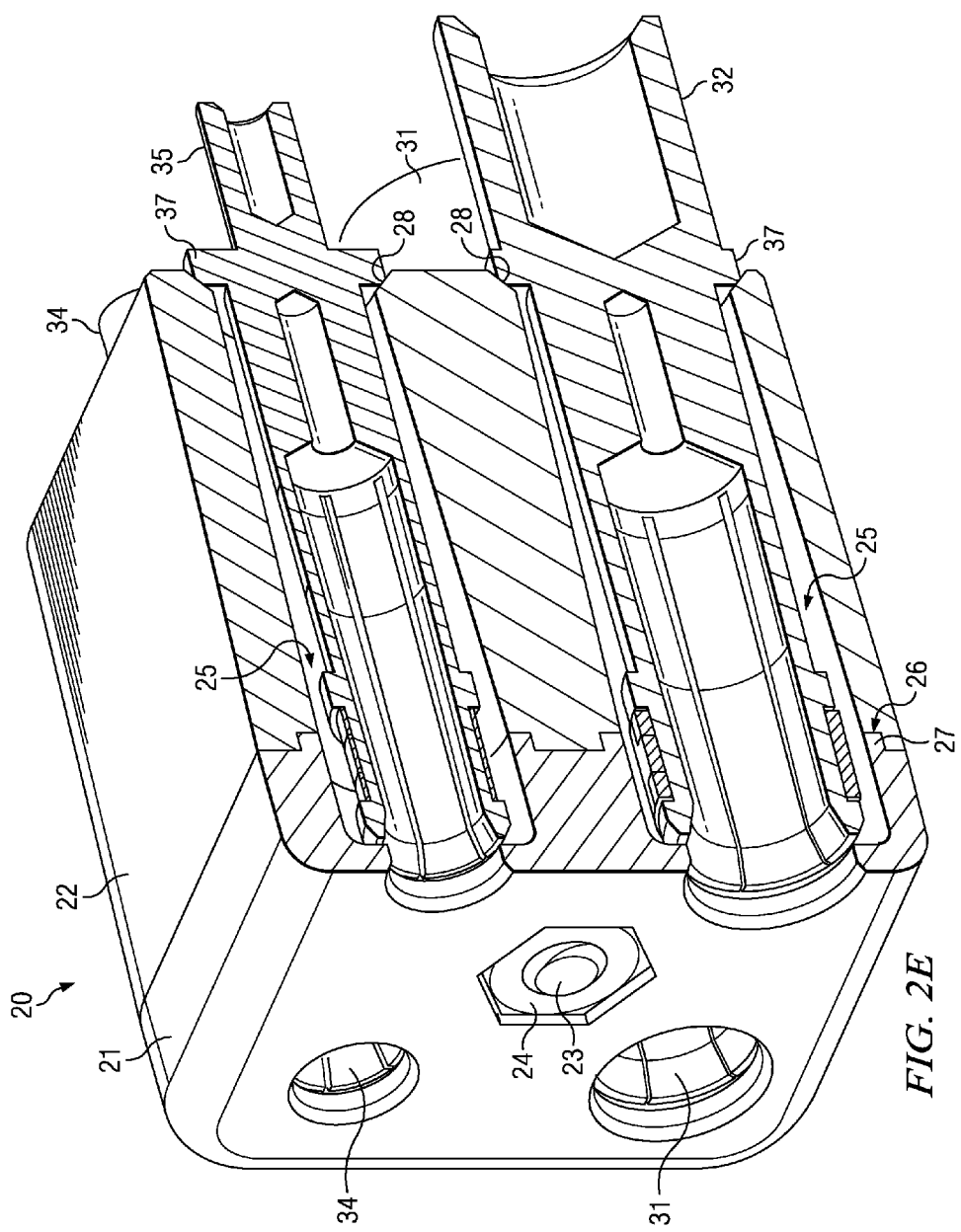
FIG. 2E is a perspective view of a vertical cross-section of the internal block of FIG. 2A, wherein the view if of the face section of the internal block so that two sockets within two respective cavities are visible.

Referring to FIG. 2E, a perspective, cross-sectional view of the internal block 20 and socket group 30 shown in FIG. 2A is illustrated. The cross-section is taken vertically through the internal block 20 so as to bisect socket "F" 35 and socket "C" 32. In this view, of the interaction between the several different annular flanges 27 and the corresponding counter-sinks 26 are visible. In particular, a secure assembly of the face section 21 to the body section 22 of the internal block 20 is facilitated when the annular flanges 27 securely insert themselves into the corresponding counter-sinks 26. This assembly is further secured by fastening the nuts 24 to the bolts 23. As previously described, a cavity 25 is defined in the internal block 20. The size of the cavity 25 is sufficiently large to allow the socket to move within the cavity 25 so as to align itself with a male contact pin of an aircraft fixed connector (receptacle). In the embodiment shown in FIGS. 2A through 2E, each of the sockets 31 through 36 are positioned within corresponding cavities 25 that are sufficiently large to allow each socket to move transversely therein. Thus, if the male contact pins of an aircraft fixed connector (receptacle) are misaligned relative to each other, so that they are no longer parallel to each other, the individual sockets 31 through 36 align themselves within their respective cavities 25 so as to mate more perfectly with the respective male contact pins. Further, each of the sockets 31 through 36 comprised an annular pivot flange 37 which engage an annular bevel pivot surface 28 at the back of the body section 22 of the internal block 20. The interface between the annular pivot flange 37 and the annular bevel pivot surface 28 provide a support for the sockets within the cavity 25, wherein the support is sufficiently flexible to allow the socket to move within the cavity 25. This annular chamfer along with the socket ring make a molding seal when the sockets are drawn forward with the screws on the arbor and seated together.

Figure 2F:
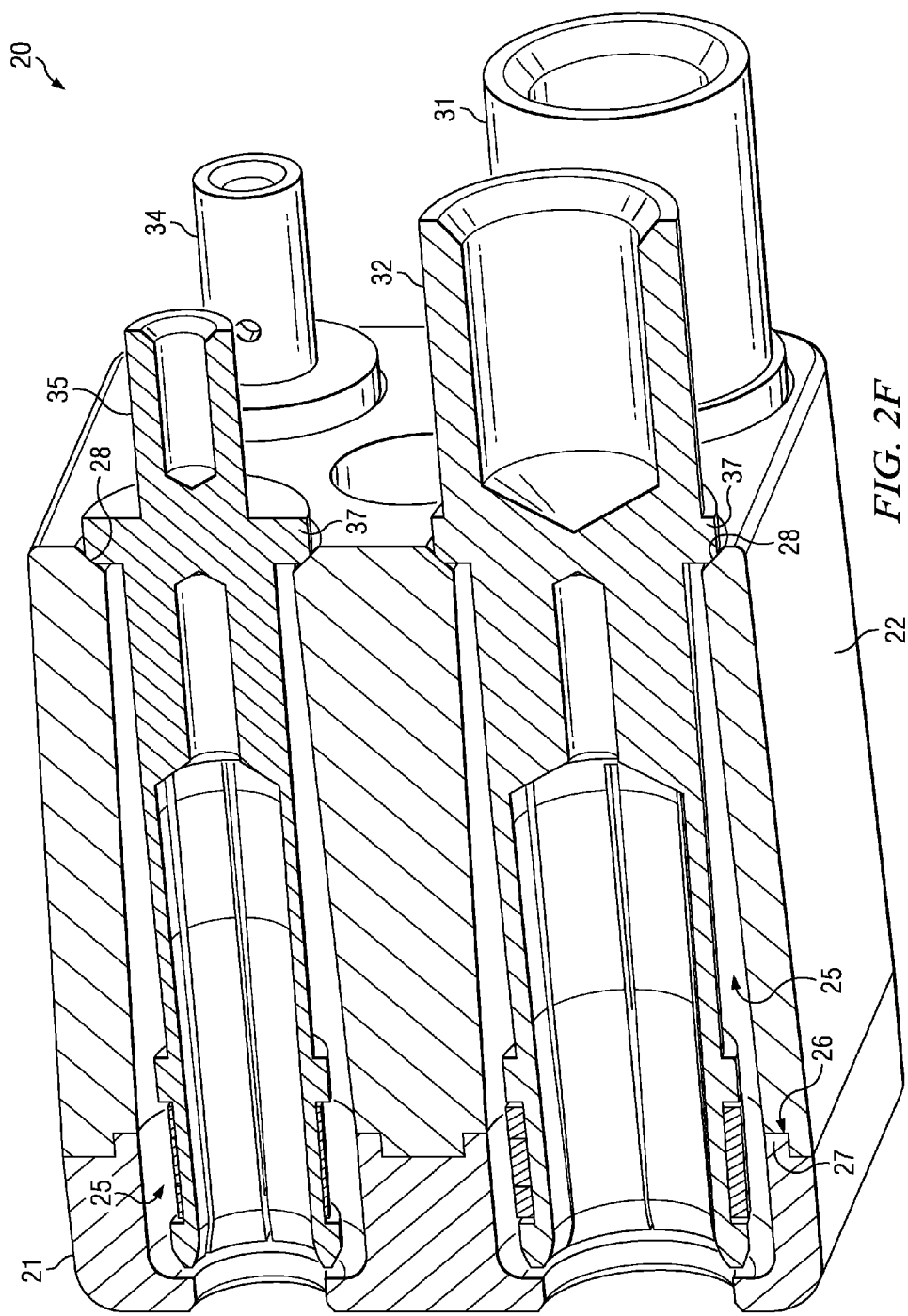
FIG. 2F is a perspective view of a vertical cross-section of the internal block of FIG. 2A, wherein the view if of the body section of the internal block so that two sockets within two respective cavities are visible and the pivot flange contacts are engaged with the pivot surface contacts. These pivots may also serve to seal the cavity during the molding process.

Referring to FIG. 2F, a cross-sectional perspective view of the internal block 20 and socket group 30 illustrated in FIG. 2A is shown. Further, this cross-sectional perspective view of FIG. 2F is similar to that of FIG. 2E except that it is of the backside of the internal block rather than the front side. From this view of FIG. 2F, the interaction between the annular pivot flange 37 and the annular bevel pivot surface 28 of each socket is plainly visible. Further, FIGS. 2E and 2F illustrate how the cavities 25 are tapered, such that the diameter of the cavity 25 at the end nearest the annular bevel pivot surface 28 is smaller than the diameter of the cavity 25 at the end extending into the face section 21 of the internal block 20. The tapered holes allow the distal ends of the sockets 31 through 36, which extend into the face section 21 of the internal block 20, to move in transverse directions while the proximal ends of the sockets 31 through 36 are held relatively fixed by the annular bevel pivot surface 28. Because these holes are tapered, a two-piece design of the internal block 20 enables construction via molding processes. An internal block 20 constructed of two parts may accommodate draft angles and seal the sockets front and back. The two parts of the internal block 20 may be held together with ¼-20 fasteners. The inside diameter of the sockets are also detailed to provide a taper in the opposite direction of the inner block's taper such that a bent mating pin will not bind in the back of the socket contact which is transversely fix by the pivot.

Figure 2G:
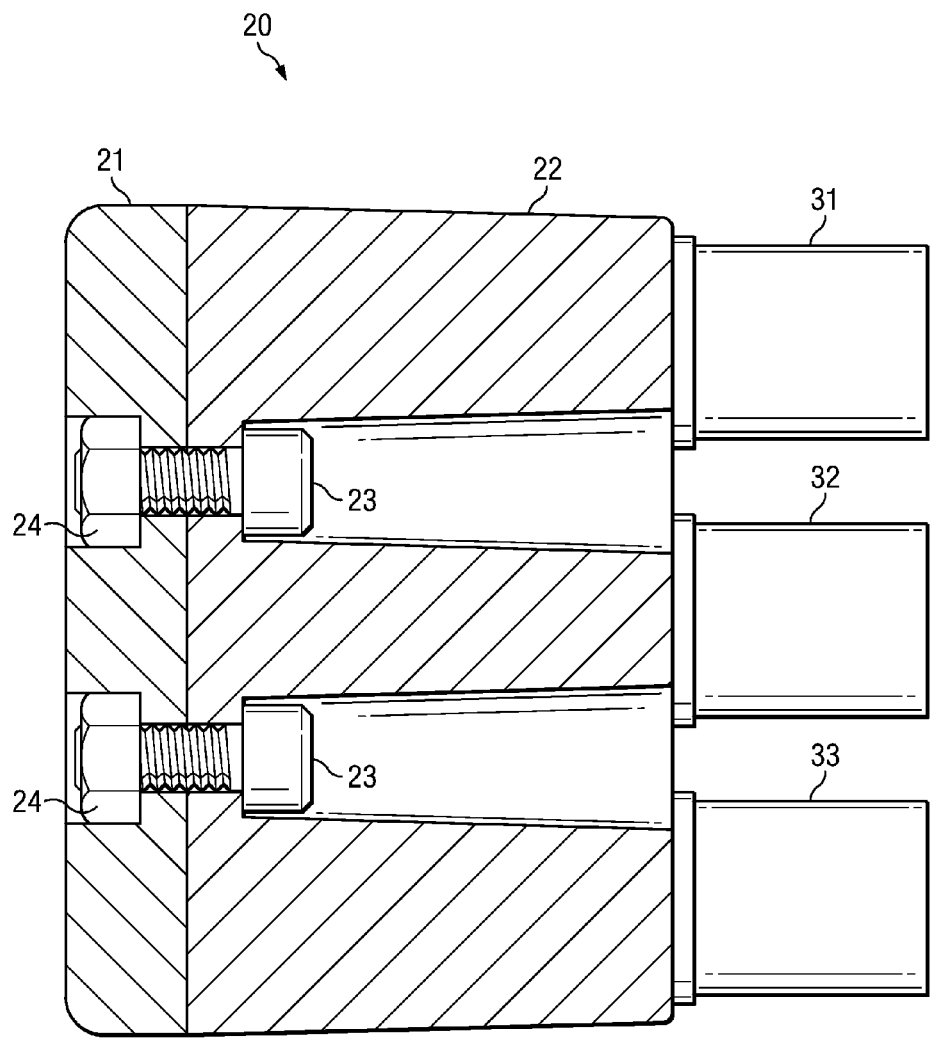
FIG. 2G is a side view of a vertical cross-section of the internal block of FIG. 2A, wherein the view if of the nuts and bolts that fasten the face section to the body section. Any suitable fastener would be acceptable, including bonding the parts together. Another configuration would be to mold a single piece block.

FIG. 2G is a cross-sectional top view of the internal block 20 and socket group 30 of FIG. 2A, wherein the cross section is taken horizontally across the two nuts 24 and bolts 23. Because this is a top view, only sockets 31 through 33 are visible. The face section 21 is connected to the body section 22 by the bolts 23 and nuts 24 to form the internal block 20.

Figure 3:
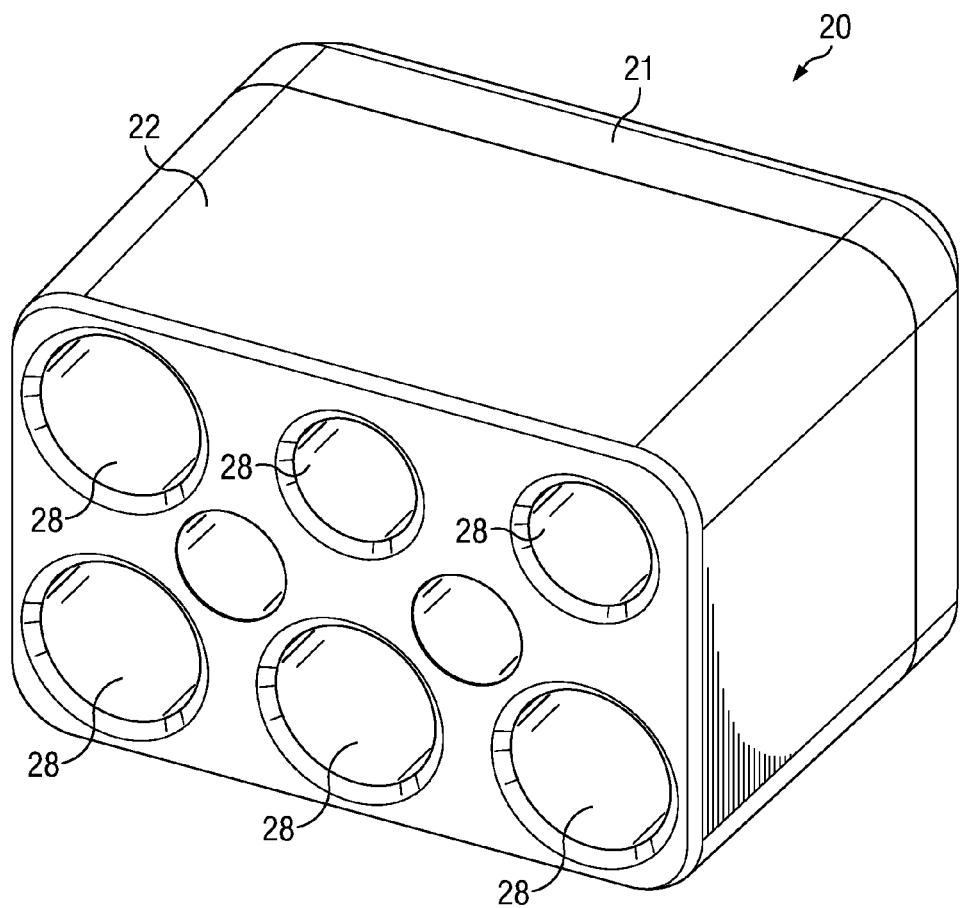
FIG. 3 is a perspective view of an internal block, wherein annular bevel pivot surfaces are visible at the rear openings of the cavities.

FIG. 3 is a perspective view of a backside of the internal block 20 shown in FIGS. 2A through 2G. At the back side of the internal block 20, each of the annular bevel pivot surfaces 28 are clearly visible.

Figure 4A:
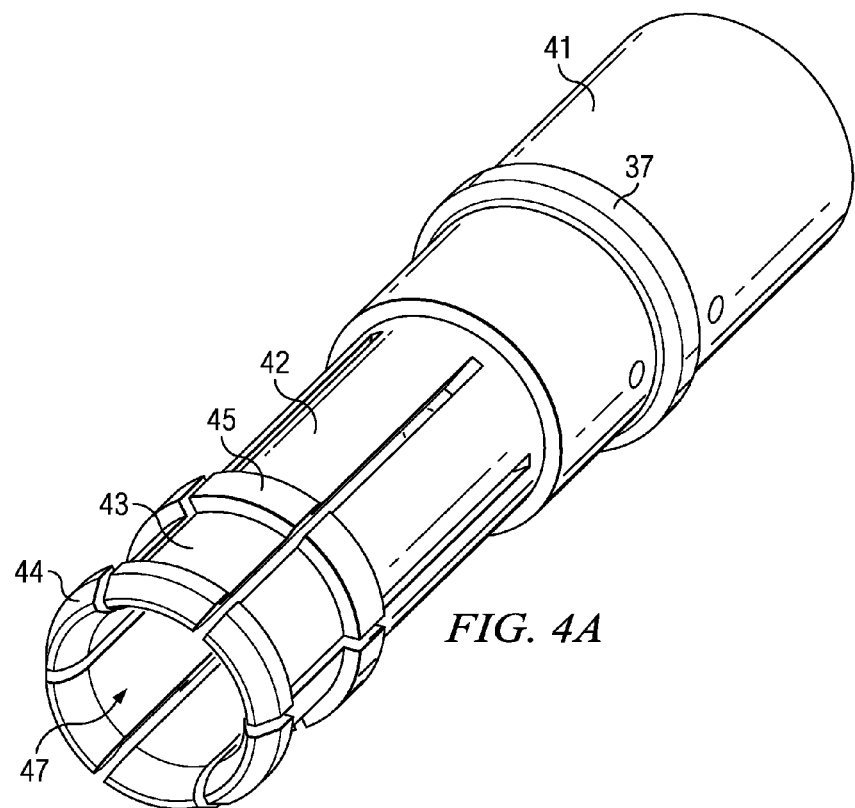
FIG. 4A is a perspective view of a female socket having a barrel section and a tyne section, wherein the female socket has a number of tynes (six are shown).

FIG. 4A illustrates a perspective view of one of the sockets of the socket group 30 shown in FIGS. 1 through 2G. The socket comprises a barrel section 41 and a tyne section 42. In the illustrated embodiment, the tyne section 42 comprises any number (six are shown) of different tynes that extend in a longitudinal direction from the barrel section 41 of the socket. The tynes from an opening 47 at their distal ends. Because the tynes in the tyne section 42 are only attached at their proximal ends to the barrel section 41, the tynes, at their distal ends, are free to flex in radial directions. The tynes of the tyne section 42 also comprise a retention section 43 defined between a distal flange 44 and a proximal flange 45. An annular pivot flange 37 extends from the barrel section 41 of the socket. In one embodiment of the invention, the inside diameter of the sockets is such to allow 0.010 inch off axis in any radial direction in the back of the contact. Copper contacts can be plated to prevent corrosion and maintain electrical performance.

Figure 4B:
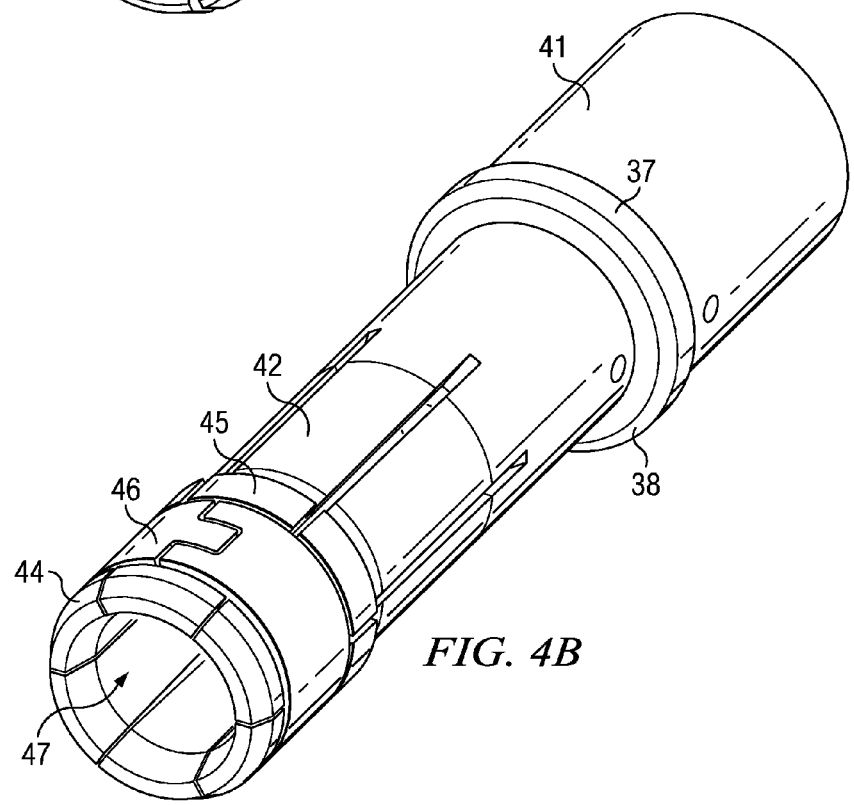
FIG. 4B is a perspective view of the female socket of FIG. 4A, wherein a retention spring is assembled to the tynes.

FIG. 4B is a perspective view of the socket shown in FIG. 4A. A retention spring 46 may be added to the distal ends of the tynes in the retention section 43 between the distal flange 44 and the proximal flange 45. The retention spring 46 encircles all of the tynes in the tyne section 42 and forces the tynes to bend or flex in radially transverse inward directions toward each other to reduce the size of the opening 47. By selecting a retention spring 46 that has a desired resilience, the socket may be engineered to apply a selected mating force with a male contact pin of an aircraft fixed connector (receptacle). A relatively stronger retention spring 46 will apply relatively stronger mating forces. In alternative embodiments, a plurality of retention springs 46 may be applied to a single socket. For example, four relatively smaller retention springs may be used to apply the same mating force as a single relatively larger retention spring. Sockets comprising a single retention spring may be cheaper to manufacture because it may take longer to apply multiple springs.

Different embodiments of the invention may have sockets that have different numbers of tynes. For example, each socket may have any number of tynes, for example, between two and ten tynes.

Figure 4C:
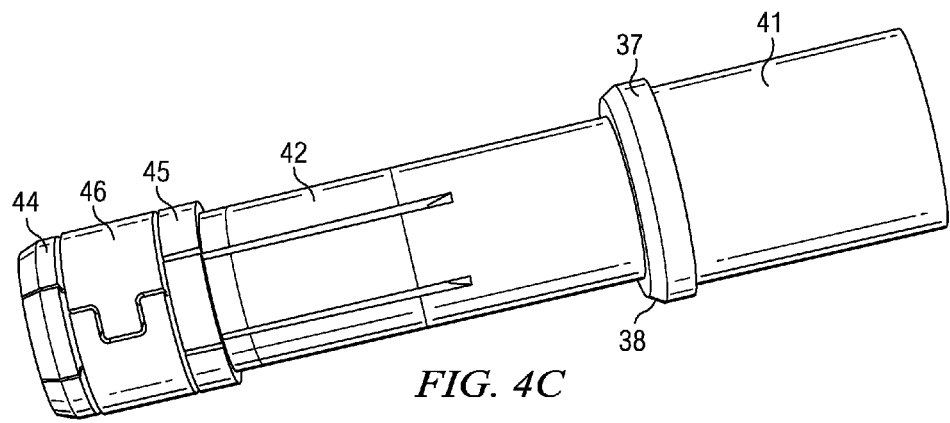
FIG. 4C is a side view of the female socket of FIG. 4A, wherein a chamfer pivot surface on a pivot flange is visible. This may also provide a seal of the cavity during a body molding process.

FIG. 4C is a perspective side view of the socket shown in FIGS. 4A and 4B. As previously noted, each socket comprises an annular pivot flange 37. The annular pivot flange 37 comprises a chamfer pivot surface 38. The chamfer pivot surface 38 enables the socket to engage the internal block 20 and pivot relative to annular beveled pivot surface 28 (see FIG. 3). From the view shown in FIG. 4C, the chamfer or rounded corner of the chamfer pivot surface 38 is more readily visible.

Figure 5A:
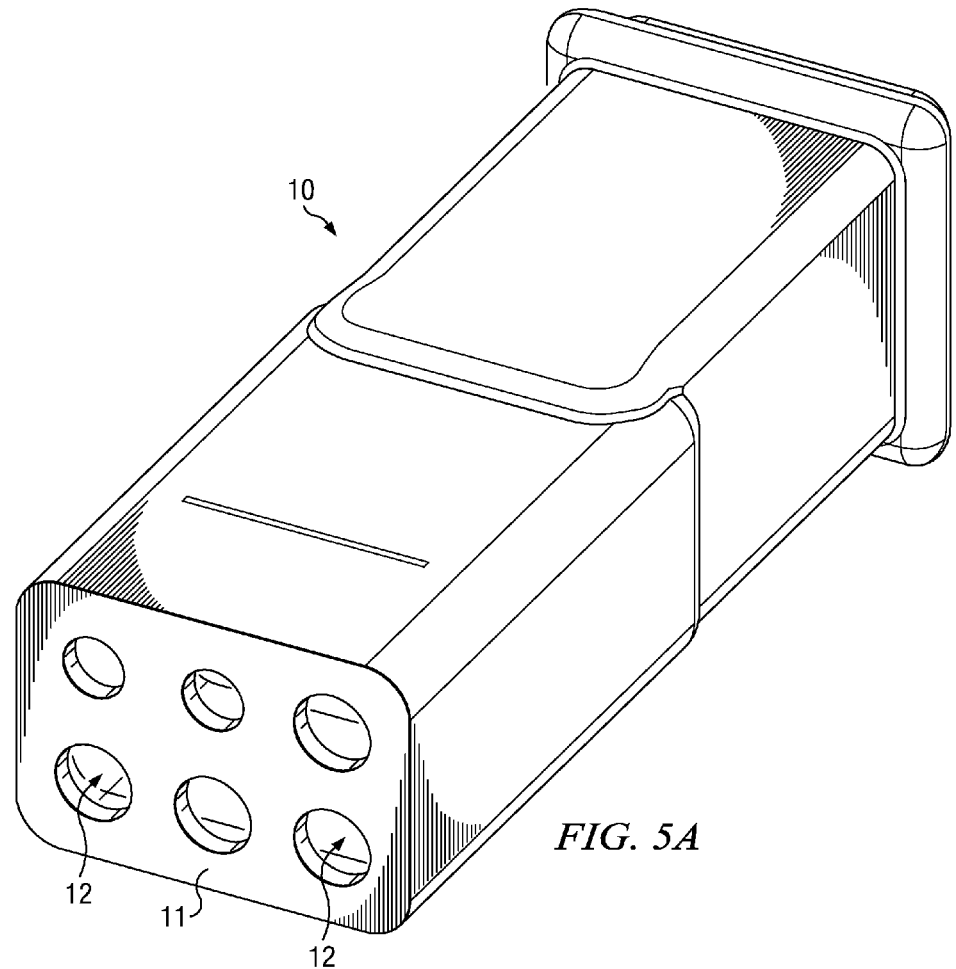
FIG. 5A is a perspective view of a plug body having a number of openings for access to equal number of female sockets (six openings are shown).
Figure 5B:
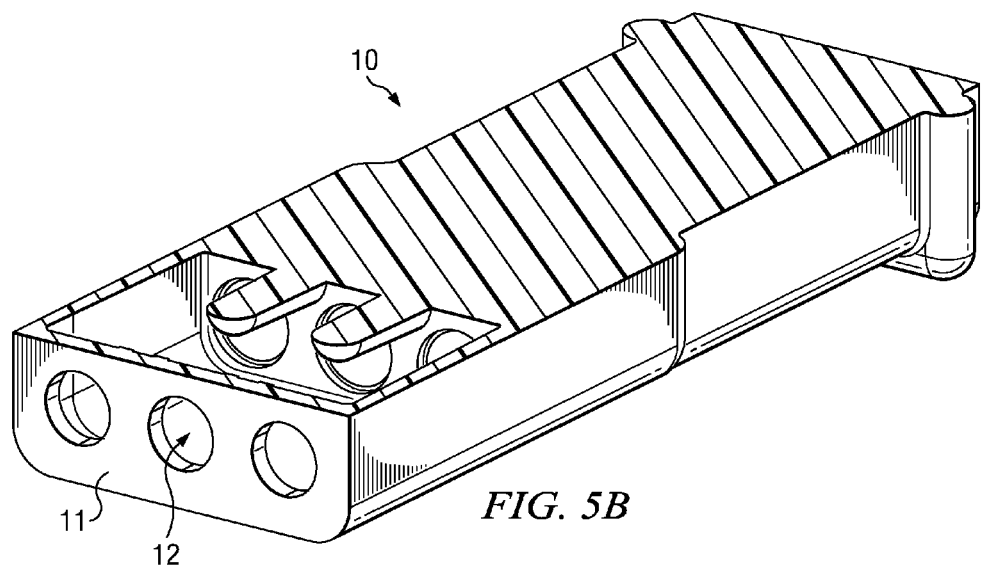
FIG. 5B is a perspective view of a horizontal cross section of the plug body of FIG. 5A, wherein a void space for an internal block and socket contacts is visible. While the plug body is illustrated by itself, according to one manufacturing process, the plug body is molded directly over the internal block and contacts.
Figure 5C:
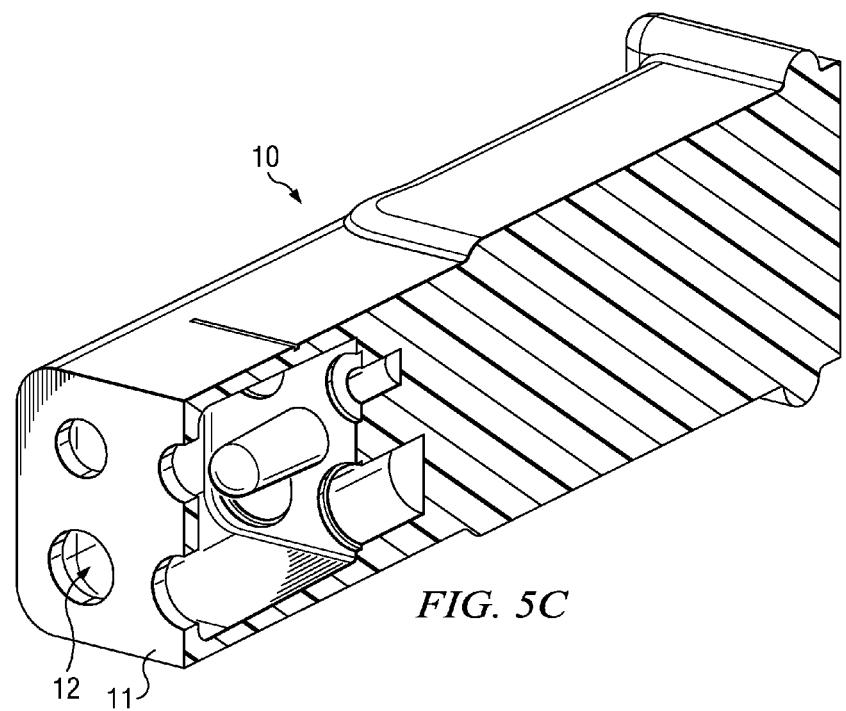
FIG. 5C is a perspective view of a vertical cross section of the plug body of FIG. 5A, wherein a void space for an internal block is visible.

Referring to FIG. 5A, a perspective view of a plug body 10 is illustrated. The plug body 10 may be a unitary molded synthetic rubber structure for housing the internal block 20 and the socket group 30, not shown. At a front face 11 of the plug body 10, openings 12 are provided to give access to each of the sockets 31 through 36 when the socket group and internal block 20 are assembled inside the plug body 10. The exterior of the plug body 10 is configured in size and shape so as to mate with an aircraft fixed connector (receptacle) as is standard in the industry. FIG. 5B is a perspective view of a horizontal cross-sectional of the plug body 10 shown in FIG. 5A. In this view, a void space is revealed to show where the internal block 20, not shown, is to be positioned within the plug body 10. FIG. 5C is a perspective view of a vertical cross-sectional view taken along a vertical plain to the middle of the plug body 10. This figure shows the plug body as illustrated in FIGS. 5A and 5B. This cross-sectional view also shows the internal void space where the internal block 20 in socket group 30 is to be positioned within the plug body 10.

Figure 6A:
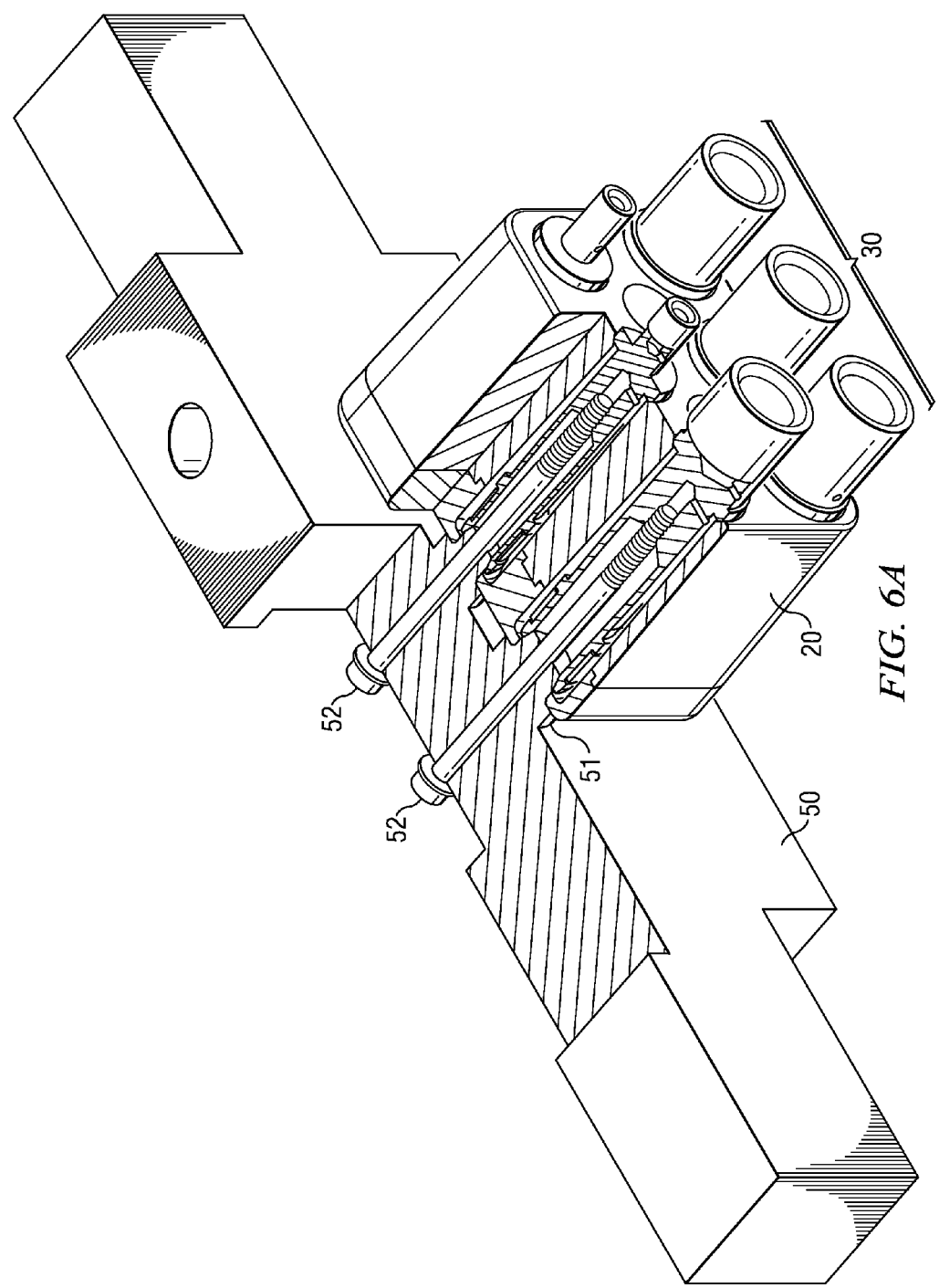
FIG. 6A is a perspective view of an arbor with an internal block mounted thereon for molding a plug body to the internal block, wherein the socket group and the internal block are fastened to the arbor in this example by COTS screws that are threaded into the sockets. Sockets and internal blocks can be fastened by other suitable methods and hardware. The arbor can be used among other manufacturing tools to form the outside housing and then is hence afterward removed.

According to one aspect of the invention, the plug body 10 may be molded over the internal block 20 and socket group 30. The plug body may be comprised of a number of chlorosulfonated polyethylene rubber, or synthetic rubber, EPDM, CSM, or similar synthetic rubber or plastic material. As shown in FIG. 6A, the plug body 10 may be molded by first securing the socket group 30 and the internal block 20 to an arbor 50. The arbor 50 has an equal number of nipples as there are contacts (six are shown) 51 that extend through the holes in the face section of the internal block 10 and into the openings 47 of the sockets in the socket group 30. These nipples are appropriately sized to interface with the different sized contacts. These nipples 51 serve to properly position the internal block 20 and socket group 30 relative to the arbor 50. The nipples provide a socket-to-socket spacing as preferentially required by the mating receptacle (1.000 inch is shown in this embodiment). The socket contacts of the socket group 30 may be loaded from the back of the internal block 20 and pulled into and against the internal block 20 with 8-32 screws 52 introduced from the front of the arbor 50. Common COTS screws 52 extend through the arbor 50 and thread into the barrel sections of sockets of the socket group 30. As the COTS screws 52 are threaded into the sockets, the sockets and the internal block 20 are pulled toward the arbor 50 until the nipples 51 are fully engaged in the sockets. A plug body 10 may then be molded over the internal block 20 and socket group 30. The thickness of the molded plug body 10 over the front of the face section may be at least about 0.100 inches so that no part of any socket, nor any part which is electrically connected to any socket may be within about 0.100 inches of the front end of the plug. This thickness could vary with other connector configurations Because the arbor holds the contacts in position, the molded plug can be immediately removed from the mold after curing.

Figure 6B:
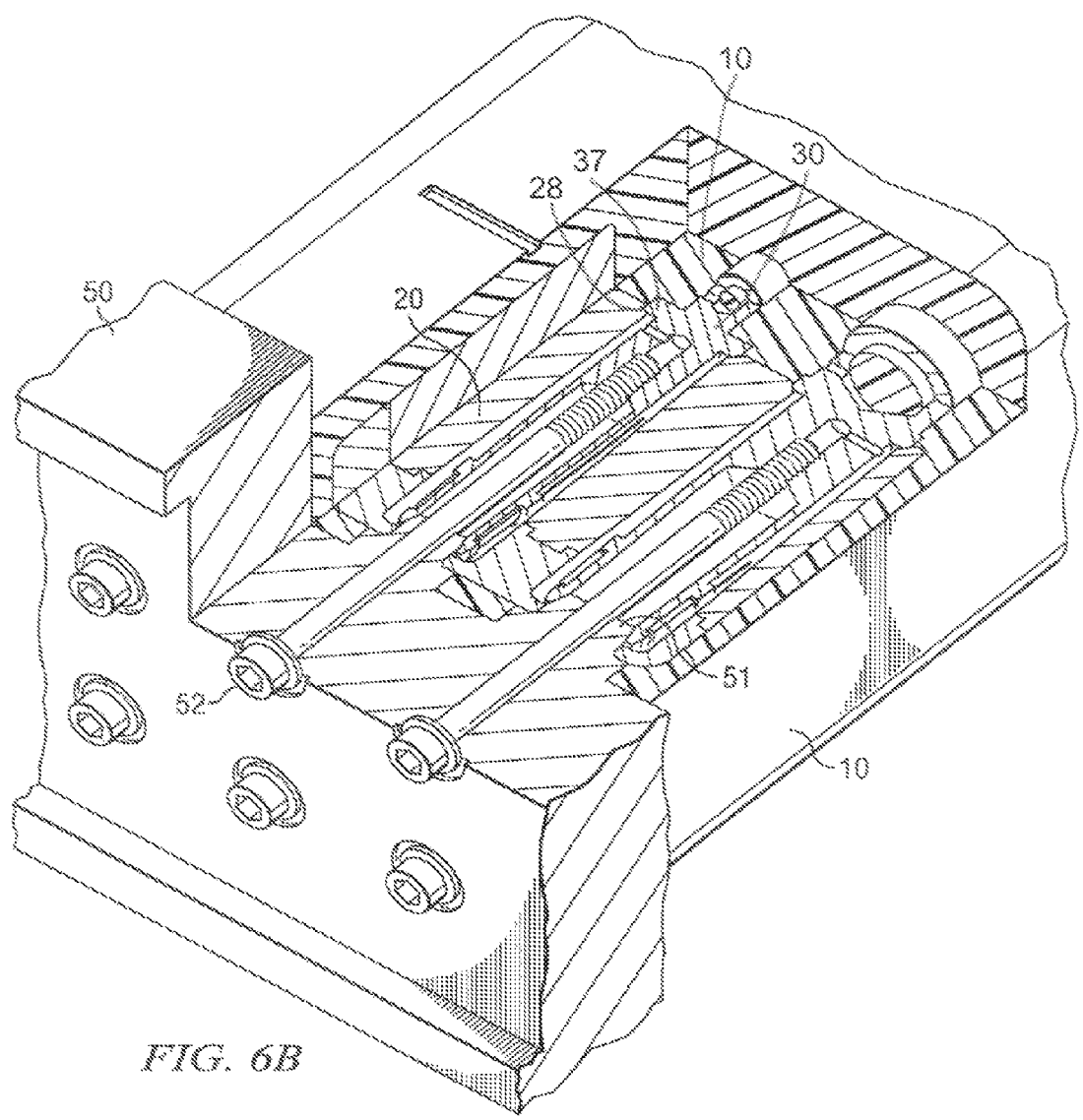
FIG. 6B is a perspective view of a plug body molded onto an internal block and a socket group, wherein a cut-away exposes cross sections of female sockets in sealed cavities within the internal block, and wherein the view is from the back of the arbor.
Figure 6C:
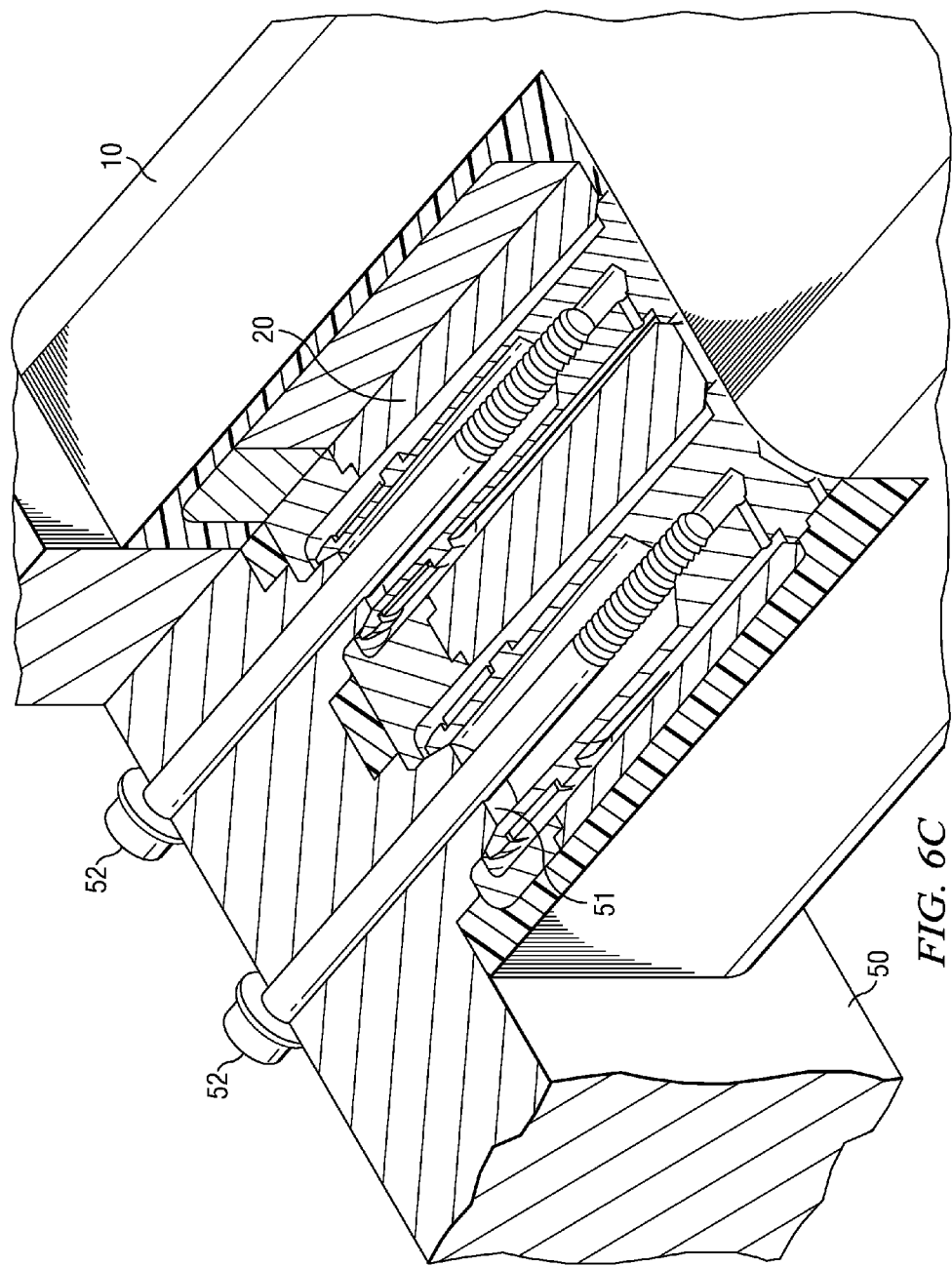
FIG. 6C is a perspective view of the plug body molded onto an internal block and a socket group of FIG. 6B, wherein the view is from the front of the arbor.

As shown in FIGS. 6A and 6B, the molded plug body completely encloses the internal block 20 and the socket group 30, except that the nipples 51 preclude any mold material from flowing into the cavities of the internal block 20. The rubber of the plug body completely encircles the exposed surfaces of the annular pivot flange 37 (see FIGS. 4A through 4C) to securely hold the sockets of the socket group 30 in the internal block 20. In particular, the molded plug body 10 secures the sockets so that the chamfer pivot surfaces 38 of the sockets 30 maintain contact with the annular bevel pivot surfaces 28 of the internal block 20. The material comprising the plug body 10 may be sufficiently flexible to allow small local elastic deformations around the annular pivot flanges 37 to allow the sockets to align with pins during engagement/disengagement.

In one embodiment of the invention, the ground power connector (plug) may have power sockets measuring 22 pounds contact force each and relay sockets measuring 2 pounds contact force each. The sum of the 4 power socket contact forces and the 2 relay socket contact forces may then be about 92 pounds. The sum of the individual socket contact forces may be close to the plug/receptacle force. This is a result of eliminating binding forces due to out of position sockets found in traditional plugs. As a result, the mating and demating forces can be accurately predicted simply by summing the individual contact forces.

The force required to mate the plug with its applicable receptacle may be as high as about 50 pounds for three-socket plugs and 100 pounds for six-socket plugs. The force required to remove the plug from the receptacle at each point in the first half-inch of travel from the fully engaged position may be about 30-50 pounds for three-socket plugs, and may be about 80 to 120 pounds for six-socket plugs. The force required to engage a female socket with a male pin contact may be up to about 24 pounds for the A, B, C and N contacts and up to about 2 pounds for the E and F contacts. The force required to remove a female socket from a male pin contact may be between about 16 to 24 pounds for the A, B, C and N contacts and about 2 pounds for the E and F contacts. The force measurements may be made using a tension/compression tester equipped with a means for measuring or recording lineal displacement versus force. The rate of movement may be about 7-9 inches per minute.

According to one aspect of the invention, the internal block may be a different color than the plug body so that when the plug body becomes worn, the internal block may be more clearly visible where the plug body is abraded away. By being different colors, the ground power connector (plug) may provide a visual indication when the connector is worn out and ready for replacement or refurbishment.

Although the inventions are described with reference to preferred embodiments, it should be appreciated by those skilled in the art that various modifications are well within the scope of the invention. From the foregoing, it will be appreciated that an embodiment of the present invention overcomes the limitations of the prior art. Those skilled in the art will appreciate that the present invention is not limited to any specifically discussed application and that the embodiments described herein are illustrative and not restrictive. From the description of the exemplary embodiments, equivalents of the elements shown therein will suggest themselves to those skilled in the art, and ways of constructing other embodiments of the present invention will suggest themselves to practitioners of the art. Therefore, the scope of the present invention is not limited herein.

Although the disclosed embodiments are described in detail in the present disclosure, it should be understood that various changes, substitutions and alterations can be made to the embodiments without departing from their spirit and scope.

What is claimed is:

1. A ground power connector comprising:
a plug body fabricated from a rubber material, the plug body comprising:
an internal block having a body section having at least one cavity defined therein, wherein the cavity comprises an inside dimension, and wherein the internal block comprises a pivot surface adjacent a distal end of the cavity; and
a female terminal socket positioned within the cavity, wherein the female terminal socket comprises a pivot flange protruding from and encircling the female terminal socket, and wherein the female terminal socket further comprises an outside dimension smaller than the inside dimension of the cavity and an outside dimension of the pivot flange,
wherein the plug body is molded over the internal block and the female terminal socket, and flexibly secures the pivot flange in contact with the pivot surface, and
wherein the internal block provides a flexible engagement between the plug body and the female terminal socket.

2. A ground power connector as claimed in claim 1, wherein the dimensions of the female terminal socket and the cavity are such that the female terminal socket is free to pivot in all transverse directions relative to a central axis of the cavity.

3. A ground power connector as claimed in claim 1, wherein the plug body comprises a molded rubber.

4. A ground power connector as claimed in claim 1, wherein the plug body comprises a molded structure.

5. A ground power connector as claimed in claim 1, wherein the female terminal socket comprises: a barrel section, a tyne section comprising at least two tynes, a tapered inside diameter to accommodate bent mating pins without adding binding forces, and at least one retention spring around the tynes of the tyne section.

6. A ground power connector as claimed in claim 1, wherein:
the plug body comprises a plurality of cavities having inside dimensions and a plurality of female terminal sockets are at least partially disposed within the cavities, respectively; and
the female sockets comprise outside dimensions, wherein the outside dimensions of the female sockets are smaller than the inside dimensions of their respective cavities.

7. A ground power connector comprising:
an internal block comprising a body section having at least one cavity, the cavity having an inside dimension and a pivot surface at a distal end of the internal block and adjacent to the cavity;
a female terminal socket positioned within the cavity, wherein the female terminal socket comprises an outside dimension and a pivot flange extending from and encircling the female terminal socket, wherein the outside dimension of the female socket is smaller than the inside dimension of the cavity and an outside dimension of the pivot flange, wherein the pivot surface of the internal block and the pivot flange are engaged to support the female terminal socket in the cavity so as to enable the female terminal socket to pivot within the cavity at the pivot surface, wherein the female terminal socket has internal features that allow engagement with bent or damaged mating pins without adding binding forces; and
a plug body that houses the internal block and the female socket and flexibly seals the female terminal socket in the cavity, and
wherein the internal block provides a flexible engagement between the plug body and the female terminal socket.

8. A ground power connector as claimed in claim 7, wherein the female terminal socket comprises: a barrel section, a tyne section comprising at least two tynes, and at least one retention spring around the tynes of the tyne section.

9. A ground power connector as claimed in claim 7, wherein the dimensions of the female terminal socket and the cavity are such that the female terminal socket is free to pivot in all transverse directions relative to a central axis of the cavity.

10. A ground power connector as claimed in claim 7, wherein:
the internal block comprises a plurality of cavities having inside dimensions;
a plurality of the female terminal sockets positioned within the cavities, respectively.

* * * * *